United States Patent [19]
Stamers et al.
[11] 3,798,758
[45] Mar. 26, 1974

[54] METHODS OF MAKING A CORE FOR A MAGNETIC RECORDING AND REPRODUCING HEAD WITH NARROW TRACK WIDTH

[75] Inventors: Kenneth Stamers, Woking; Derek Frank Case, Sunbury-On-Thames, both of England

[73] Assignee: International Computers Limited, London, England

[22] Filed: Nov. 17, 1971

[21] Appl. No.: 199,547

[30] Foreign Application Priority Data

Jan. 26, 1971 Great Britain ..................... 3223/71

[52] U.S. Cl. ........................... 29/603, 179/100.2 C
[51] Int. Cl. ............................................ G11b 5/42
[58] Field of Search ...................................... 29/603

[56] References Cited

UNITED STATES PATENTS

| | | | |
|---|---|---|---|
| 3,369,292 | 2/1968 | Manders | 29/603 |
| 3,672,044 | 6/1972 | Tanaka et al. | 29/603 |
| 3,514,851 | 6/1970 | Perkins et al. | 29/603 |

*Primary Examiner*—Daryl W. Cook
*Assistant Examiner*—Robert S. Tupper
*Attorney, Agent, or Firm*—Hane, Baxley & Spiecens

[57] ABSTRACT

A method of making a magnetic recording and reproducing component includes, providing in a ferrite member a plurality of grooves defining side-by-side Vee shaped ridges which are reinforced by filling the grooves wwth non-magnetic material. The each ridge apex is then machined to expose a ferrite surface and is bonded to a second ferrite member by means of non-magnetic material so that each face is separated from the second ferrite member by a gap filled with non-magnetic material. A third member is preferably bonded to the second member to produce a second gap aligning with the first gap. Cutting the members between the adjacent ridges to provide a corresponding number of separately operable components.

8 Claims, 9 Drawing Figures

METHODS OF MAKING A CORE FOR A MAGNETIC RECORDING AND REPRODUCING HEAD WITH NARROW TRACK WIDTH

The present invention relates to methods of making magnetic recording and reproducing devices.

BACKGROUND OF THE INVENTION

In producing magnetic recording and reproducing read/write heads with narrow track widths, for example 25 to 500 microns it has been found that machining damage will alter the magnetic properties of a head to a significant extent at high frequencies for example frequencies involved in video-recording techniques. This problem is particularly noticeable when a ferrite is employed as the magnetic material of such heads. It has been found that the above machining damage to ferrite is particularly noticeable when 'air abrasion' techniques have been employed in fabricating the read/write heads.

Another problem which occurs in the production of ferrite heads having narrow track widths, such as mentioned above or those of the order of 0.0035 inch, is that ferrite, when in the form of thin slices or members, is extremely brittle or frangible and is liable to breakage when subjected to various machining operations.

SUMMARY OF THE INVENTION

According to a first aspect of the invention there is provided a method of making a core for a magnetic recording and reproducing head, including the steps of providing a first ferrite member with a plurality of parallel grooves of tapered cross section defining a plurality of parallel ridges, filling each of said grooves with non-magnetic reinforcing material, machining the apex of each ridge and a corresponding portion of said reinforcing material to form a face of exposed ferrite of required dimensions, at each said apex, bonding by means of further non-magnetic material a second ferrite member to the first member such that each said face is separated from said second ferrite member by a gap of said further non-magnetic material, and cutting at least one of the bonded first and second members along planes disposed between the adjacent ridges to provide a corresponding plurality of separately magnetisable cores.

BRIEF DESCRIPTION OF THE DRAWING

A method of making recording/reproducing heads embodying the present invention will now be described by way of example, with reference to the accompanying drawing, in which.

DESCRIPTION OF THE PREFERRED EMBODIMENT

Figures 1, 2, 3, 4:
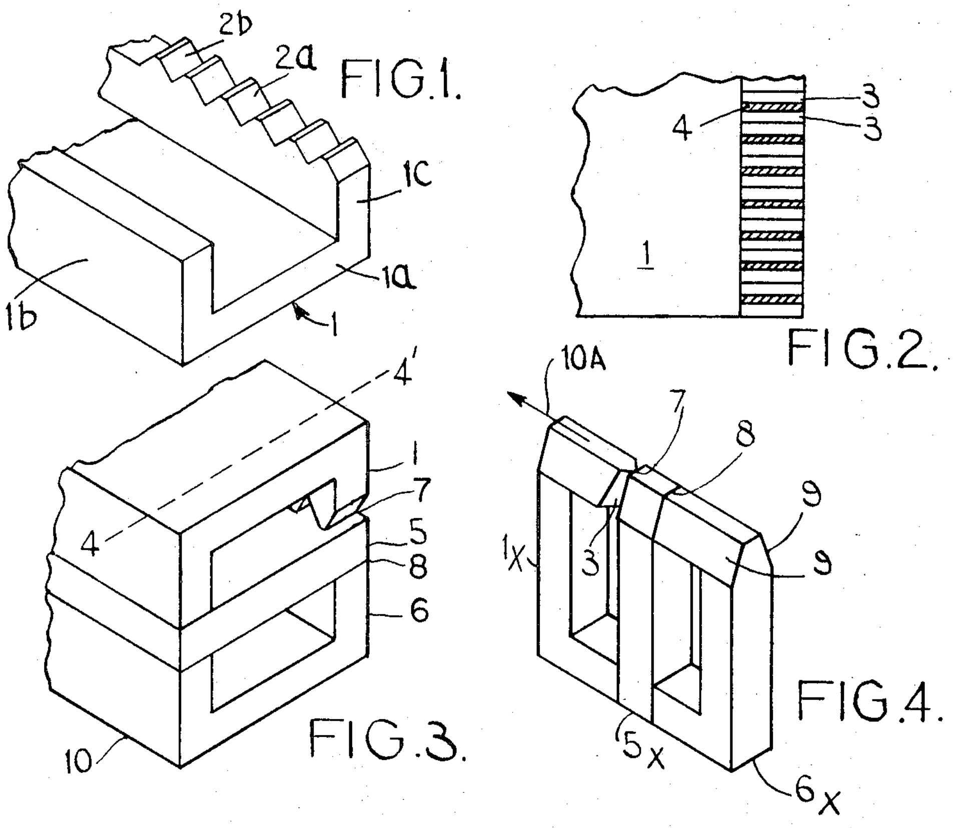
FIG. 1 shows a ferrite member having a channel section and having V shaped ridges and grooves therein.
FIG. 2 shows a top view of the member of FIG. 1, subsequent to reinforcing the walls of the ridges and after a machining operation.
FIG. 3 shows an assembly including the member of FIGS. 1 and 2 and at a later stage of the method of the present invention.
FIG. 4 shows a component produced from the assembly of FIG. 3.

Referring to FIG. 1 of the drawing there is shown a ferrite member 1 having a channel cross section with a base 1*a*, and walls 1*b* and 1*c*. The member 1 can be a formed flat centre channel section.

A plurality of adjacent grooves 2*a* are formed in the wall 1*c*. The formation of the grooves produces ridges 2*b*. The grooves and ridges have a V or tapered cross-section and are substantially parallel to one another. The grooves 2*b* may be formed by a "hob" lapping technique with care being taken to ensure that the grooves are equally spaced from one another in the channel section ferrite member 1.

The grooves are then filled in with a non-magnetic material 3 as shown in FIG. 2. The filling material 3 is also required to act as a reinforcement for the walls or side faces of the ridges 2*b*. For these purposes, it has been found that a glass is suitable. The filling material 3 is then machined along the ridges 2b to expose a substantially rectangular face 4 of ferrite at the outer extremity or apex of each ridge 2*b*. During the machining operations, the filling material 3 acts as a support and reinforcement for the ridges 2*b* of ferrite and prevents cracking and/or other damage to the ridges. Thus it has been found that by employing a reinforcing material (the material 3) at this stage of the process, the magnetic and mechanical properties of the resultant heads (FIG. 4) will not be unnecessarily impaired.

The machining of the member 1 may include lapping and polishing operations with the degree of machining determining the width (the direction transverse to the axis of the grooves) of the ferrite face 4 of each ridge 2*b*. This width, for example, may be 0.0035 inch or less and will, in the resulting magnetic head, form the active width of the read/write gap, and hence, the width of the recording track (not shown) of any suitable recording medium. The wall 1*b* or the channel member is also machined to be of an even height with ferrite faces 4 and filling material 3.

Referring now to FIG. 3, a composite assembly or article 10 is formed by glass bonding a ferrite plate 5 to the top surfaces of the walls 1*b* and 1*c* of the member 1 to form a non-magnetic gap 7 between the plate 5 and the face 4 of each ridge 2*b*. The ferrite plate 5 may be glass-bonded to channel section 1, with a glass which can be heated to a temperature which may soften the glass filling and reinforcing material 3 but will not adversely affect the magnetic and mechanical properties of the ferrite. As is actually shown in the Figure a second channel shaped ferrite member 6, is also bonded to the other face of the plate. Similarly, glass may be used as a bonding material to form a non-magnetic gap 8 between the ferrite plate 5 and the channel member 6. The completion of the second bonding step produces the assembly 10 comprising ferrite members separated by gaps of non-magnetic bonding materials as indicated in the drawing.

It will be appreciated that while glass has been proposed as a filling and reinforcing material 3 and as a bonding material, different chemical compositions of glass may be used in different steps of the method.

Also, other non-magnetic materials e.g. ceramics, may be employed rather than glass. In practice an important limitation must be strictly observed in selecting the appropriate non-magnetic materials, is that when a material is processed in a subsequent step, the processing temperatures must not be great enough to soften a non-magnetic material processed previously. Thus, regardless of which material is employed to bond the ferrite plate 5 to the member 1, the bonding material must not require processing temperatures great enough to soften the filling and reinforcing material 3 when subsequent bonding operations are performed.

Upon completion of the boding steps the assembly is divided along the line 4' — 4' of FIG. 3 along planes passing through the of each of the original grooves 2*a* (FIG. 1) to produce a head element, which includes a section 1 X of the channel member 1, a section 5X of the plate 5 and a section 6X of the channel member 6. The thickness that is the width of the operative surface of each head element is equal to the groove pitch or the distance between corresponding points on the ridges 2*b* (FIG. 1). Each element is cut away along the side edges to reduce the width of the gap 8 between the member section 1X and the plate section 5X, and between the plate section 5X and the member section 6X. The cutting away can be attained by chamferring or tapering the side walls of the sections by a machining operation such as lapping, the sections to provide surfaces 9 which lie at, for example, an angle of 30°, to the side walls of the sections the surfaces 9 can be have a uniform separation or converge towards each other to provide a wedge shape. The cutting away operation removes maginal strips from the operative surface and thus serves to reduce the width of the gap 8 between the plate section 5X and the member section 6X.

During the chamferring operation a portion of the filling and reinforcing material is removed although this material will act to prevent damage to the narrow portion of the channel member section 1X adjacent to the gap 7. Thus after chamferring or other forming operation each element will have an erase gap 8 which although some what reduced in width than the read/write gap 7 is wider than the read/write gap 7. A magnetic recording medium (not shown) will be passed over the read/write gap 7 and erase gap 8 in the direction of the arrow 10A.

Figure 5:
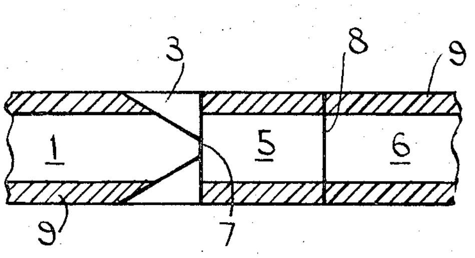
FIG. 5 is a top view of the component of FIG. 4 on an enlarged scale.

In FIG. 5 a top view of the dual gapped head is shown with the read/write gap 7 separating a portion of channel section 1X and ferrite plate 5X while an erase gap 8 separates ferrite plate section 5X from the channel member section 6X. As is shown the width of the erase gap 8 is wider than that across the read/write gap 7.

Figure 6:
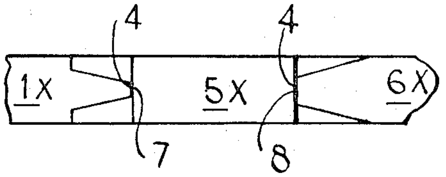
FIGS. 6 and 7 are views corresponding to FIG. 5 illustrating two possible modifications of the invention.

A further embodiment of a head element is shown in FIG. 6. In this embodiment, channel member sections 1X and 6X are formed from channel members (not separately shown) similar to that of FIG. 1, which have Vee shaped grooves both having the same pitch, but whose respective ridges are machined so that the ridges of the member 1 have a greater width of ferrite for the faces 4 at the extremities of the ridges than the corresponding faces 4 of the other member 6. The two members are bonded to the ferrite plate 5 such that the surfaces 4 of the respective members are aligned. After the bonding operation and subsequent slicing of the assembly in the manner described in relation to FIGS. 1 to 4 a number of individual heads of the form shown in FIG. 6 are obtained, each having a predetermined read/write and erase track width dimensions. The arrangement of FIG. 6 avoids the need to cut away or chamfer the individual heads.

Figure 7:
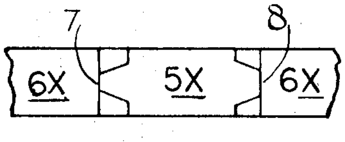

The head element of FIG. 7 is formed from an assembly of two channel ferrite members and a ferrite plate member in which the side-by-side tapered ridges are produced, not by forming side-by-side grooves in one of the walls of each channel member but by forming grooves in opposed surfaces of the plate member. The grooves on the surfaces have the same ritch and different ridge tapers so that on performing the reinforcing and machining operation to expose the ferrite faces 4, the faces 4 on one surface are of smaller width than the corresponding faces 4 on the opposite surface.

The channel members are then bonded to the plate by the non-magnetic material to define the read/write and erase gaps, and subsequently devided into the individual units as shown in FIG. 7, in which the channel members sections are both referenced 6X since they are effectively equivalent to the section 6X of FIG. 4, and the plate section 5X.

With the head assembly of FIG. 7 problems of mutual alignment of the two sets of ridges are eliminated.

Figure 8:
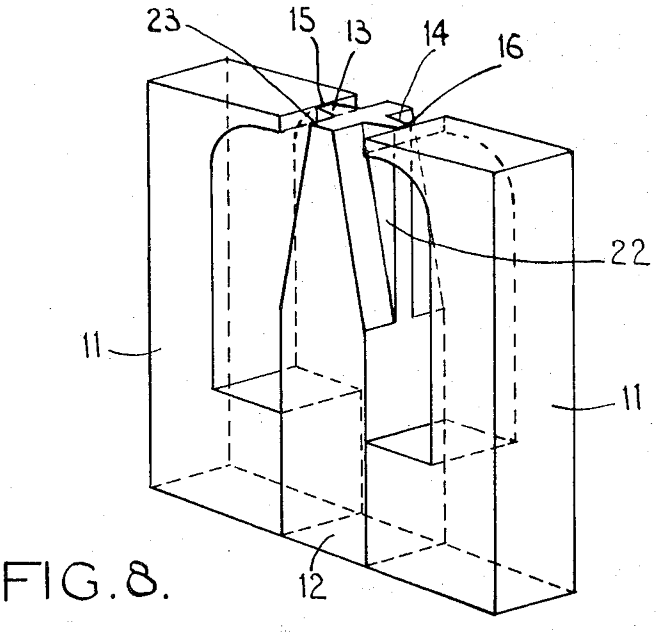
FIG. 8 is a perspective view of a further embodiment of a head element.

FIG. 8 shows a further embodiment of a magnetic head including two similar channel sections 11 of ferrite and an intermediate section 12 also of ferrite. The section 12 has a generally rectangular cross-section with one end formed in a generally cruciform shape which defines ridges 13 or 14 which co-operate with the adjacent portions of the channel sections 11 to define the head gaps 15 and 16 respectively.

Te sections 11, and 12 are bonded together by the non-magnetic material such as glass the bonding, in conjunction with the relative dimensions of the sections, being such as to provide said gaps which are bonding material filled. The shaping of the ridges respectively defines the read/write and erase track widths, the latter being somewhat wider than the write/read head track width. The sections 11, 12 are initially formed as longer elements. The formation of the intermediate section 12 is shown in greater detail of FIG. 9. In this figure a block 17 of ferrite in parallelopiped form is grooved on opposed surfaces 18, 19 by two sets of grooves 20, 21 the grooves having the same pitch but of differing taper angle, so that the outer extremities 22, 23 of the sets of ridges 24, 25 respectively produced by the provision of the grooves 20, 21 are of different width. After the grooves have been formed they are filled with a non-magnetic material such as glass which serves to reinforce the faces, and edges of the ridges 24, 25, during the machining of the latter to expose the working faces at said extremities 22, and 23.

Figure 9:
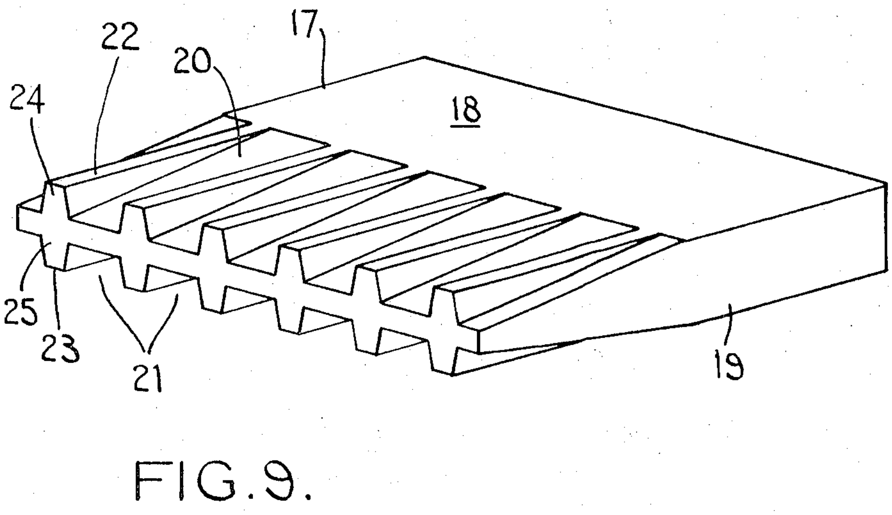
FIG. 9 illustrates a perspective view of a detail of the head element figure.

After the machining, channel section members comprising extended lengths of the sections 11, are bonded to the grooved and machined intermediate member 12 to provide an assembly of the sections 11, 12 as shown in FIG. 9. The bonded assembly is then cut or divided in to sections by slicing the assembly along planes passing through centres of the grooves to produce the head as shown in FIG. 8.

If it is desired to form multi-magnetic head assemblies, the assemblies, before the various above describes stages of separating the assemblies into slices, are machined or cut, so that the channel members 1, 6 or 11 are sliced into the separate sections whilst leaving the intermediate ferrite members 5, or 12 intact. This arrangement provides a number of separate individual cores having a common intermediate section.

Alternatively the assemblies may be machined so that individual cores are initially partially segmented by cutting from the pole tip faces i.e., the gap ends of the assemblies to approximately half way through the assembly. The partially cut assembly is then assembled into a head pad and adhered with a glass or a epoxy resin to provide a part cut block. The cores are then finally separated by cutting from the back of the part cut block to meet the original cut and this electrically and magnetically separates the thus formed individual heads. With this arrangement a magnetic head block is obtained in which a plurality of heads are rigidly mounted with respect to each other, by a separation determined by the pitch of the original ridges.

In this specification while the term machining has been used to describe operations performed on both ferrite and non-magnetic members, it will be understood that this term is to be construed in a general sense in that a machining operation may include lapping, polishing, grinding, ultra-sonic cutting polishing, electro-cutting methods, and the like.

We claim:

1. A method of making a core for a magnetic recording and reproducing head including the steps of: providing a first ferrite member with a plurality of parallel grooves of tapered cross section defining a plurality of parallel ridges; filling each of said grooves with non-magnetic reinforcing material; machining the apex of each ridge and a corresponding portion of said reinforcing material to form a face of exposed ferrite of required dimensions at each said apex; bonding by means of further non-magnetic material a second ferrite member to the first member such that each said face is separated from said second ferrite member by a gap of said further non-magnetic material, said gap being the transducing gap; and cutting at least one of the bonded first and second members along planes disposed between adjacent ridges to provide a corresponding plurality of separately magnetisable cores each having a transverse width greater than that of said ferrite face.

2. A method as claimed in claim 1, including the further steps of providing the first member with a plurality of parallel further grooves of tapered cross section to define a plurality of further ridges on a surface opposite to that with the first mentioned grooves, and of the same pitch as and aligned with the first mentioned grooves, filling the further grooves with non-magnetic reinforcing material, machining the apexes of said further ridges and corresponding portions of said reinforcing material to form a face of exposed ferrite on each further ridge, and before said cutting step, bonding a third ferrite member to the first member by non-magnetisable material in such a manner that each of the further ridges on the first member is spaced from the third member by a second gap filled by non-magnetisable material, wherein said cutting step further includes cutting said third member along planes disposed between adjacent ones of said further ridges to provide after cutting a plurality of separately magnetisable dual gapped cores.

3. A method as claimed in claim 1 and including effecting the cutting step so that the components are completely separated from each other.

4. A method as claimed in claim 1, further including the step of bonding a third ferrite member to the second member before said step of cutting said members; in such a manner that the second and third members are spaced from each other by a second gap which is filled by non-magnetic material, wherein said cutting step further includes cutting said third member to provide after said cutting step a plurality of separately magnetisable dual gapped cores.

5. A method as claimed in claim 4, and including effecting said cutting step so as to leave one of said members intact, whilst cutting the other members sufficiently to isolate magnetically the individual cores between the regions of cutting, thereby to permit said cores to be separately magnetisable while remaining mechanically joined.

6. A method as claimed in claim 4, including forming the first member as a channel shaped element and providing grooves in one of the side walls of said element, forming the second member as a flat plate, and forming said third member also as a channel shaped element with side walls having plane faces which are bonded to said second member.

7. A method as claimed in claim 6, including the further step of chamferring the portions of said members providing said second gap so as to reduce the transverse width of said second gap.

8. A method of making a core for a magnetic recording and reproducing head including the steps of: providing a first ferrite member with a plurality of parallel grooves defining a plurality of parallel ridges each ridge having a plannar face at its apex; filling each of said grooves with a reinforcing material which is non-magnetic; machining the apex of each ridge and a corresponding portion of said reinforcing material to form a face of exposed ferrite of required dimensions at each said apex; bonding a second ferrite member to the planar faces of the first ferrite member by means of a non-magnetic material; bonding a third ferrite member to the second ferrite member by means of further non-magnetic material; cutting at least the first and third members along planes disposed between adjacent ridges to provide a plurality of separately magnetisable cores each having a first transducing gap between said first and second ferrite members filled with the first mentioned non-magnetic material the transverse width of this first gap being determined by the width of said planar face, and having a second transducing gap between said second and third ferrite members filled with said further ferrite material; and chamferring said first second and third members to reduce the transverse width of said second gap to a predetermined value without affecting the width of said first gap.

* * * * *